(12) United States Patent
Matsushima et al.

(10) Patent No.: US 8,628,048 B2
(45) Date of Patent: Jan. 14, 2014

(54) ATTACHING MEMBER FOR ELECTRIC WIRING OF A VEHICLE SEAT

(75) Inventors: Iwao Matsushima, Miyoshi (JP); Keiji Morimoto, Anjou (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/269,141

(22) Filed: Oct. 7, 2011

(65) Prior Publication Data

US 2012/0097806 A1    Apr. 26, 2012

(30) Foreign Application Priority Data

Oct. 21, 2010   (JP) .................................. 2010-236217

(51) Int. Cl.
*F16L 3/00* (2006.01)

(52) U.S. Cl.
USPC ............................... 248/71; 248/73; 248/74.1

(58) Field of Classification Search
USPC ........... 248/73, 74.1, 65, 68.1, 71, 74.2, 74.5, 248/27.1, 27.3
See application file for complete search history.

(56) References Cited

U.S. PATENT DOCUMENTS

| 4,312,487 | A | * | 1/1982 | Kimura | 248/73 |
| 4,700,913 | A | * | 10/1987 | Hirano et al. | 248/73 |
| 4,865,280 | A | * | 9/1989 | Wollar | 248/68.1 |
| 5,535,969 | A | * | 7/1996 | Duffy, Jr. | 248/68.1 |
| 5,538,210 | A | * | 7/1996 | Ohmori | 248/71 |
| 7,507,906 | B2 | * | 3/2009 | Suzuki | 174/68.1 |
| 7,854,413 | B2 | * | 12/2010 | Yamamoto et al. | 248/49 |
| 7,997,656 | B2 | | 8/2011 | Inagaki et al. | |
| 8,066,250 | B2 | * | 11/2011 | Vukadin et al. | 248/562 |
| 8,123,179 | B2 | * | 2/2012 | Galle | 248/65 |

FOREIGN PATENT DOCUMENTS

JP    11-321414    11/1999

\* cited by examiner

*Primary Examiner* — Steven Marsh
(74) *Attorney, Agent, or Firm* — Greenblum & Bernstein, P.L.C.

(57) ABSTRACT

An attaching member is provided. The attaching member attaches an electric wiring on a body member of the vehicle seat. The attaching member integrally incldues: an attaching part to be attached on the body member; a protection part which covers an edge of the body member; and a holder part which holder the electric wiring.

9 Claims, 7 Drawing Sheets

ATTACHING MEMBER FOR ELECTRIC WIRING OF A VEHICLE SEAT

BACKGROUND OF THE INVENTION

1. Field of the Invention

The present invention relates to a attaching member for an electric wiring of a vehicle seat, which attaches the electric wiring on a body member of the vehicle seat.

2. Description of the Related Art

In a related art, a vehicle seat includes a spring that elastically supports a seat cushion from the bottom and an attaching member that attaches an electric wiring on the spring (see JP-A-1999-321414). The attaching member includes an attaching part to be attached on the spring and a holder part holding the electrical wiring.

When the electric wiring is provided close to a member having an edge, the electric wiring is caused to contact the edge by some vibration or the like, and the electric wiring could be thus damaged. Therefore, there has been demanded an attaching member having a configuration in which the electric wiring is difficult to contact an edge of a member.

SUMMARY OF THE INVENTION

According to an illustrative embodiment of the present invention, there is provided an attaching member which attaches an electric wiring on a body member of the vehicle seat, the attaching member integrally comprising: an attaching part to be attached on the body member; a protection part which covers an edge of the body member; and a holder part which holds the electric wiring.

According to the above configuration, the edge of the body member is covered by the protection part. On this account, the electric wiring can be prevented from being damaged due to contacting the edge of the body member. The attaching member integrally includes the attaching part, the protection part, and the holder part. As a result, while the number of components does not increase, the electric wirings can be attached on the body member, and also can be protected from the edge of the body member.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
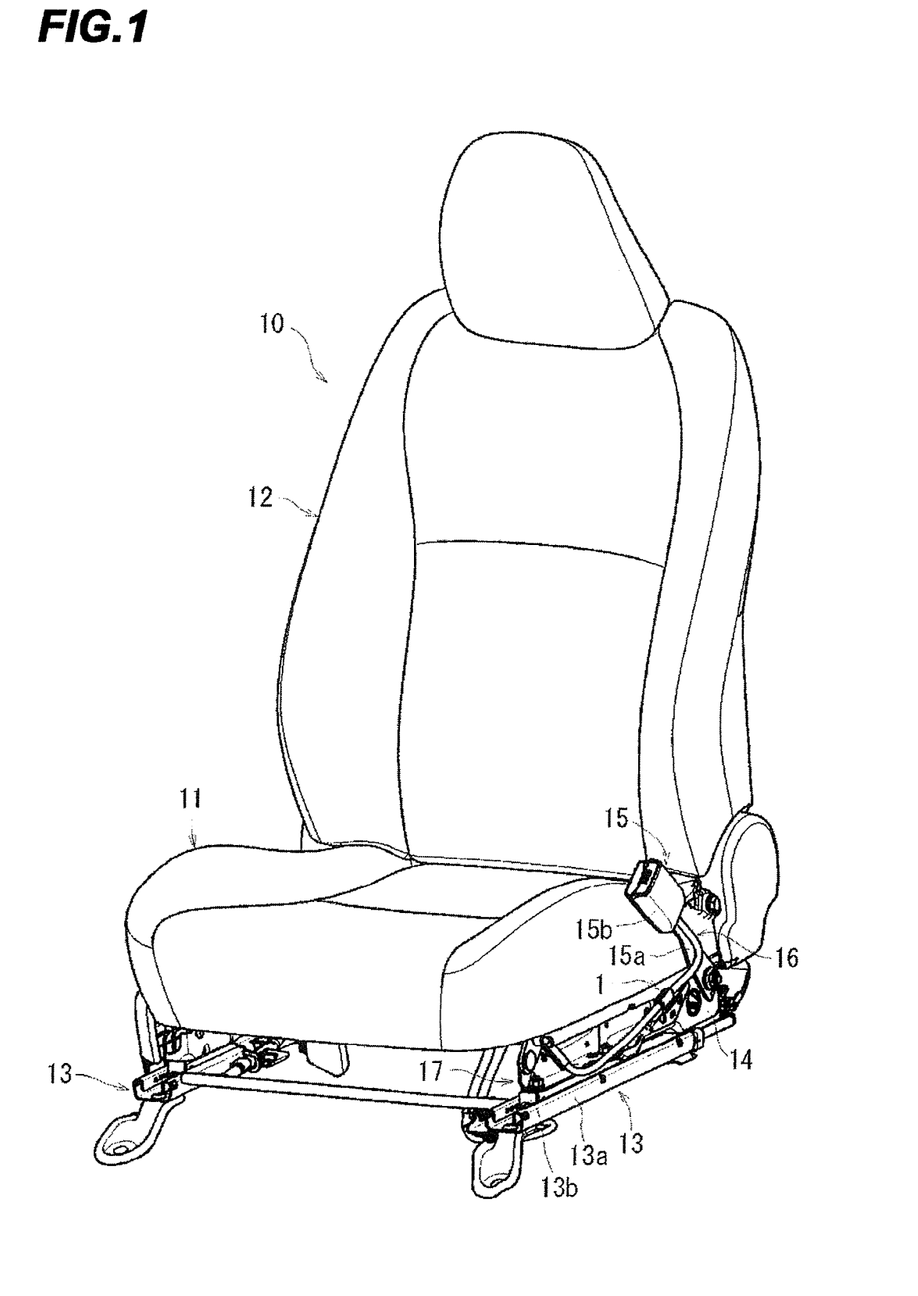
FIG. 1 is a perspective view of a vehicle seat.

An illustrative embodiment of the present invention will be described with reference to FIGS. 1 to 8. As shown in FIG. 1, a vehicle seat 10 includes a seat cushion 11 and a seat back 12 erected in the rear of the seat cushion 11. An elevating device 17, a rail 13, and an anchor member (body member) 14 are installed below the seat cushion 11.

The rail 13 includes a lower rail 13a attached on a flower surface of a vehicle and an upper rail 13b movably mounted on the lower rail 13a, as shown in FIG. 1. The anchor member 14 and the elevating device 17 are installed on the upper rail 13b. The elevating device 17 is configured to elevate the seat cushion 11 with respect to the upper rail 13b.

Figure 2:
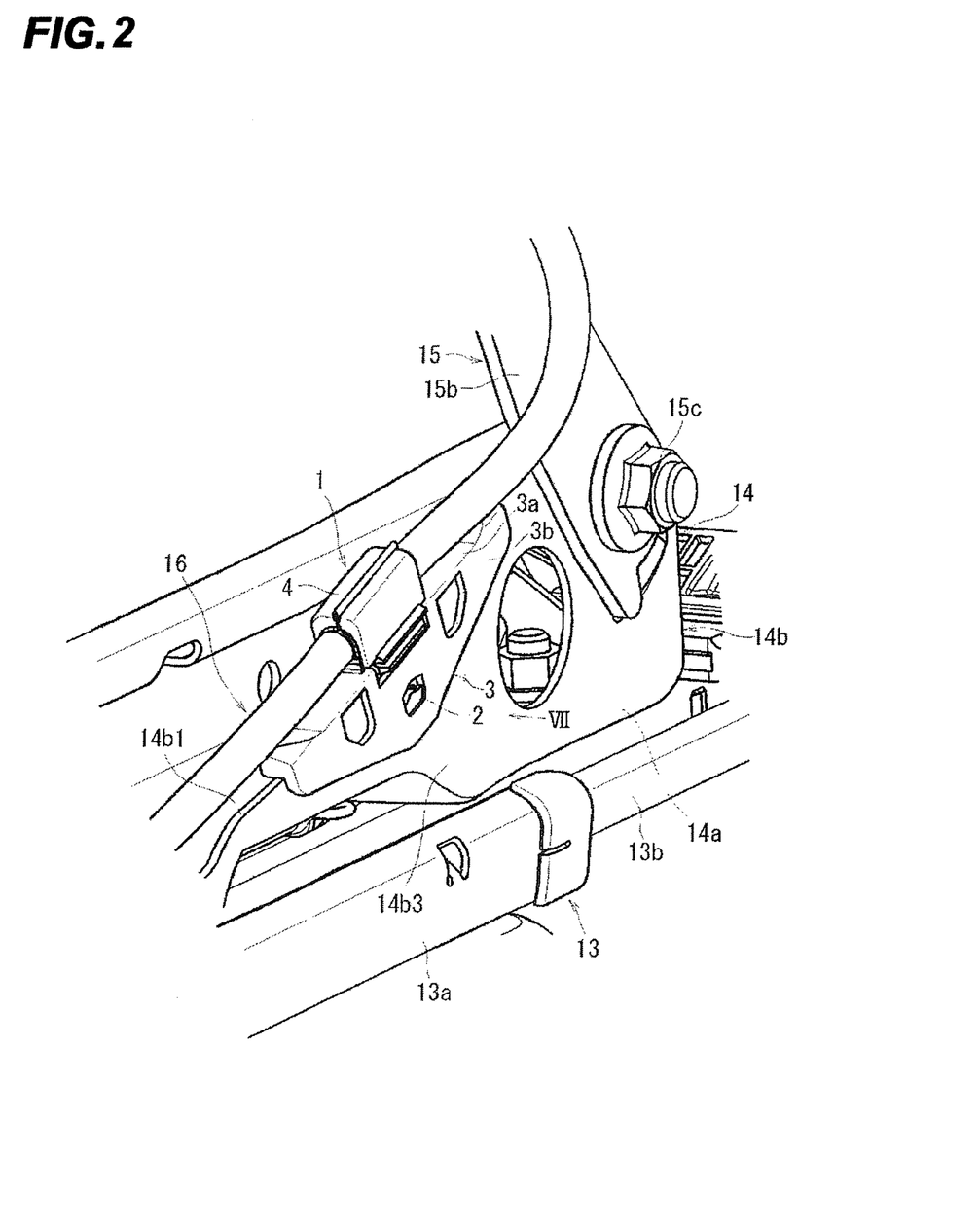
FIG. 2 is a partially enlarged view of FIG. 1.
Figure 3:
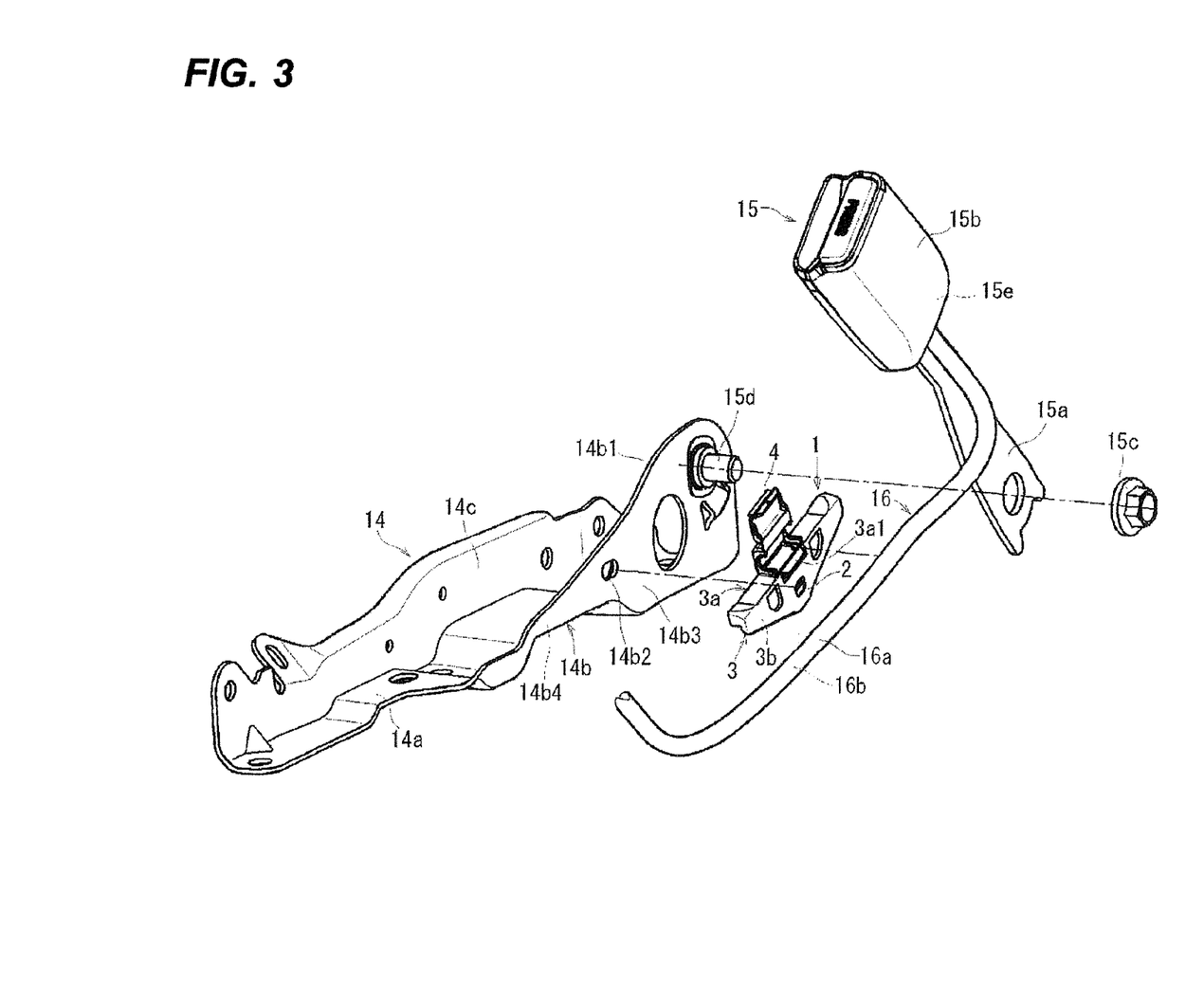
FIG. 3 is a perspective view of an attaching member, an anchor member, an electric wiring and a seat belt.

As shown in FIGS. 2 and 3, the anchor member (body member) 14 is made of metal, and includes a base portion 14a attached on the top surface of the upper rail 13b, an outer-side piece 14b extending upwards from the outer periphery of the base portion 14a, and an inner-side piece 14c extending upwards from the inner periphery of the base portion 14a. A bolt 15d is attached on the rear portion of the outer-side piece 14b, and the seat belt 15 is connected to the bolt 15d.

The seat belt 15 includes an arm 15a and a buckle 15b, as shown in FIG. 3. The arm 15a is made of metal, and is rotatably attached with respect to the bolt 15d by a nut 15c. The buckle 15b releasably holds a tongue (not shown) inserted into the buckle 15b. The tongue is attached to a belt connected to a vehicle body. Therefore, the tongue is held by buckle 15b, and as a result, the seat belt is connected to the anchor member 14.

In the buckle 15b, there is installed a switch 15e which is capable of detecting whether the tongue is inserted into the buckle 15b, as shown in FIG. 3. The switch 15e is connected with an electric wiring 16 extending from the buckle 15b and connected with a control device installed in a vehicle via the electric wiring 16.

Figure 7:
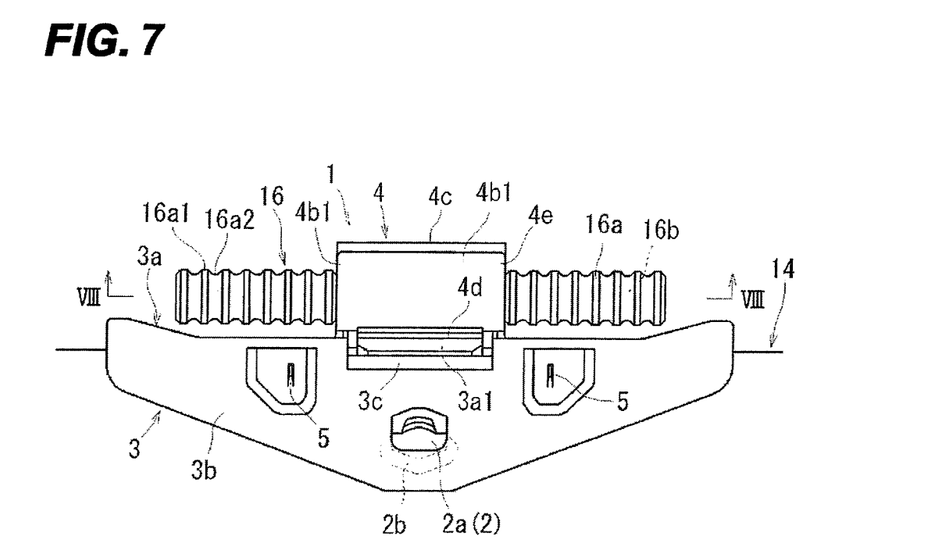
FIG. 7 is a diagram viewed from an arrow VII of FIG. 2.

The electrical wiring (wire harness) 16 includes a plurality of electric wires 16b and a cover 16a, as shown in FIGS. 3 and 7. The cover 16a having a cylindrical shape covers the plurality of electric wires 16b. The cover 16a alternately includes a plurality of convex portions 16a1 that are convex in a diameter direction and a plurality of concave portions 16a2 that are concave in the diameter direction. The electric wiring 16 is attached on the anchor member 14 by the attaching member 1.

Figure 4:
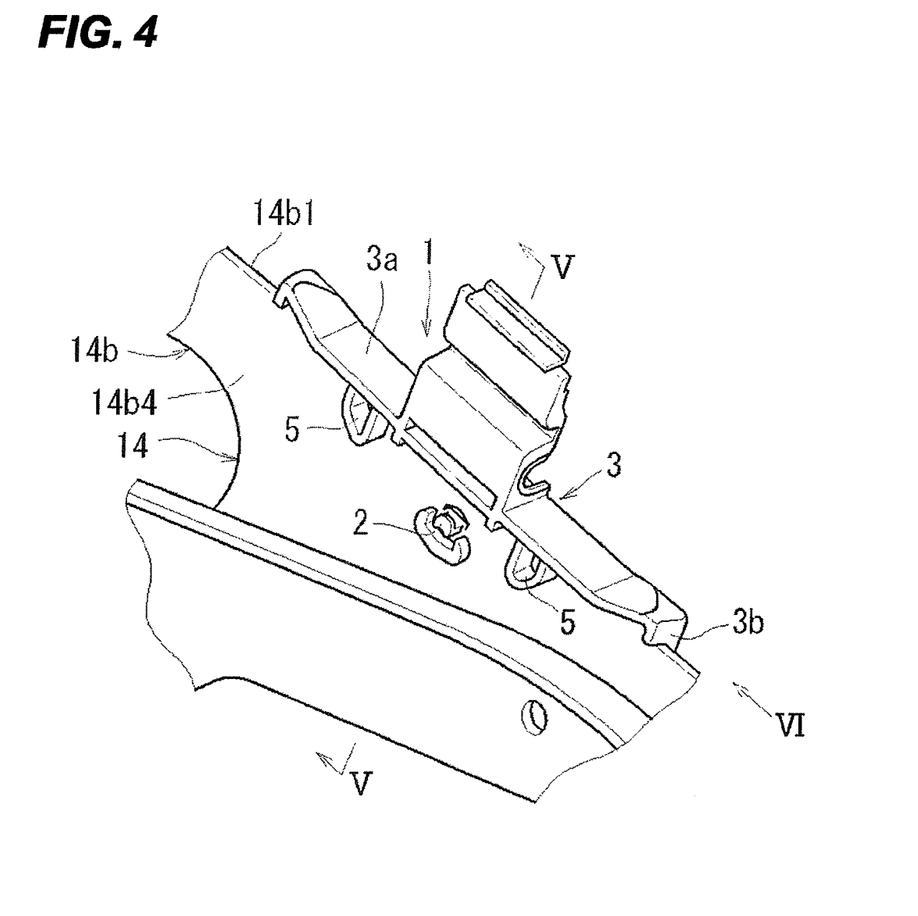
FIG. 4 is a perspective view of an attaching member and an anchor member.

The attaching member 1 is made of a resin and integrally includes an attaching part 2, a protection part 3, and a holder part 4, as shown in FIGS. 3 and 4. The protection part 3 having an L-shaped cross section integrally includes a first cover portion 3a and a second cover portion 3b. The second cover portion 3b extends in parallel to and covers an outer surface 14b3 of the outer-side piece 14b of the anchor member 14. The first cover portion 3a projects from the upper periphery of the second cover portion 3b to cover an upper edge 14b1 of the outer-side piece 14b from above.

Figure 5:
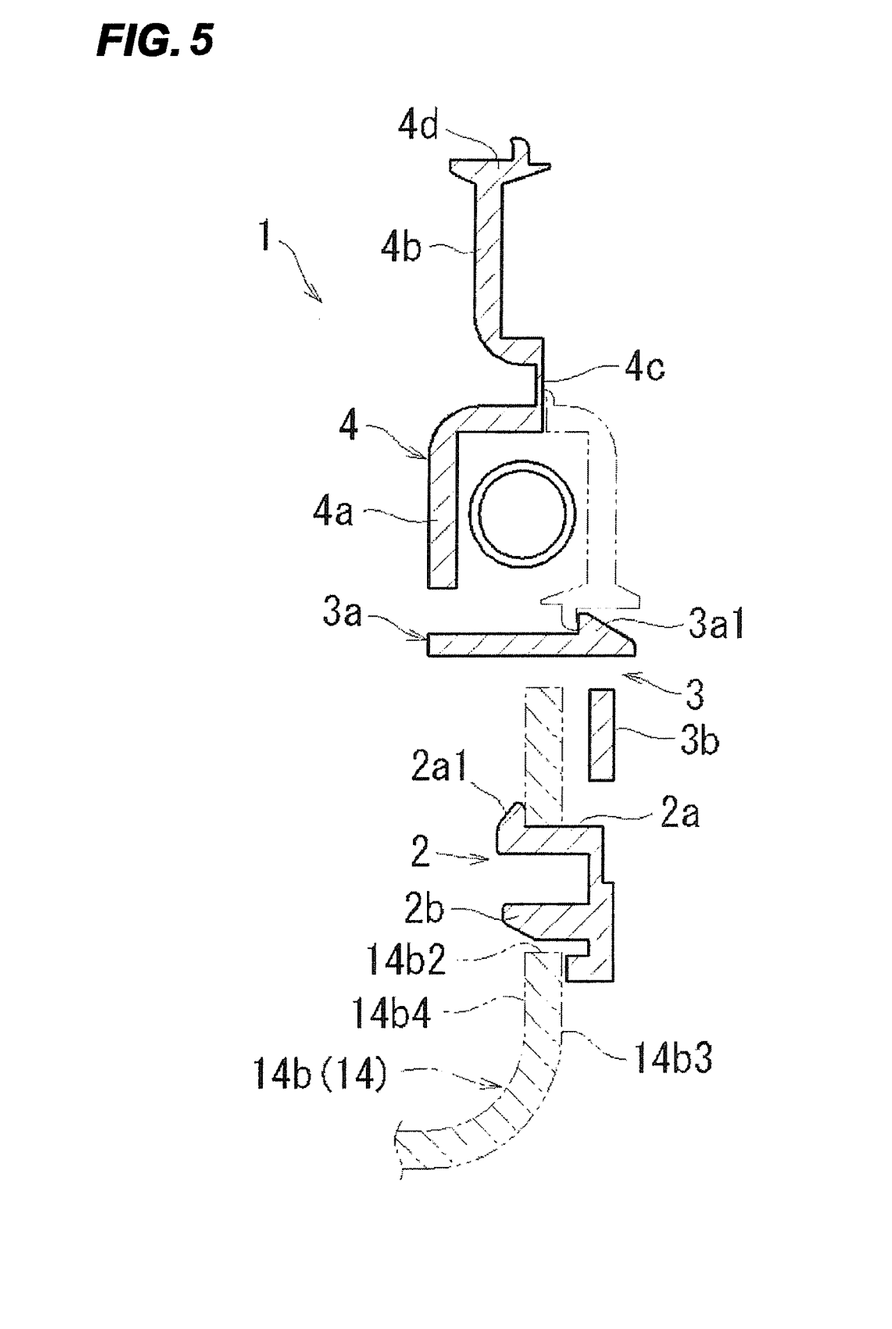
FIG. 5 is a cross-sectional view taken along a line V-V of FIG. 4.
Figure 6:
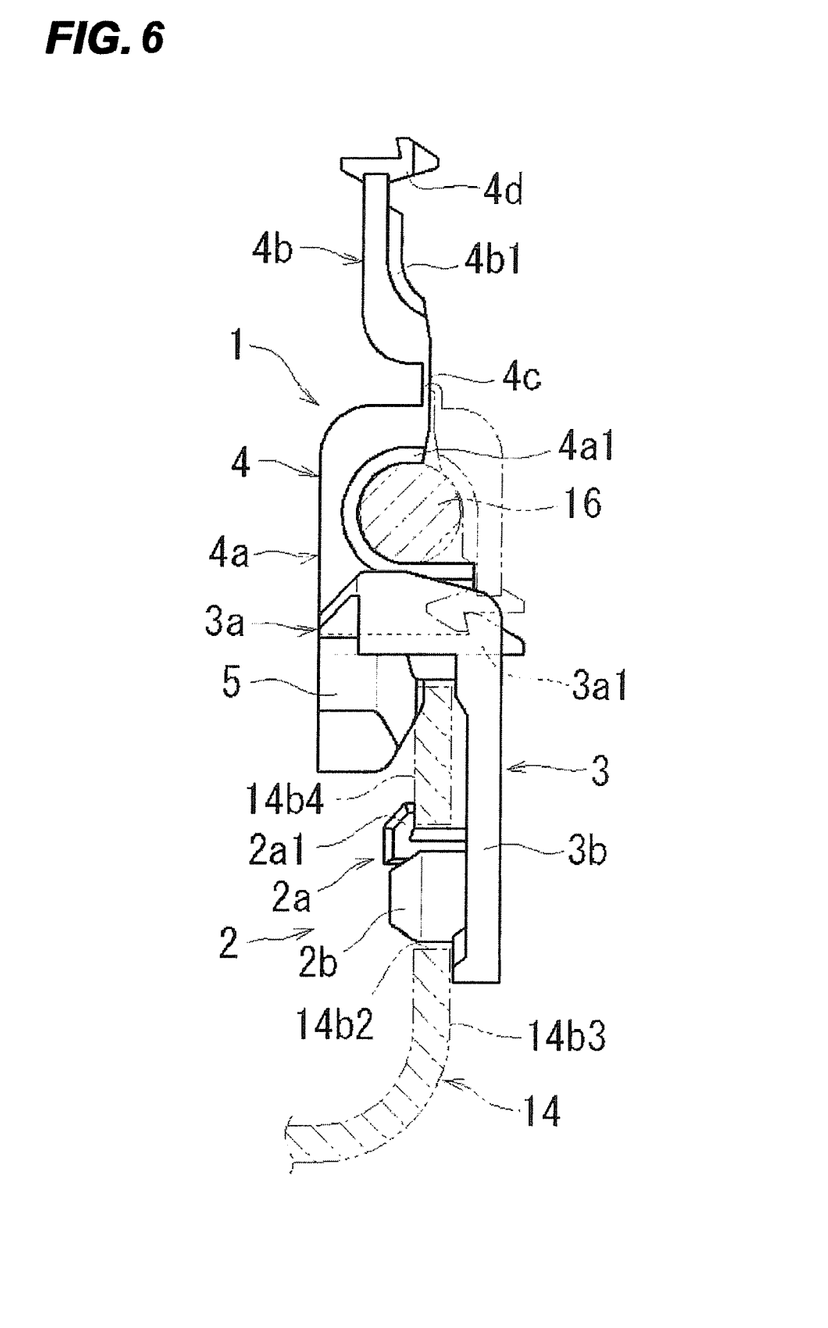
FIG. 6 is a diagram viewed from an arrow VI of FIG. 4.

The attaching part 2 includes a first piece 2a and a second piece 2b projecting from the second cover portion 3b in a projecting direction orthogonal to an extending direction for the second cover portion 3b, as shown in FIGS. 5 and 6. The tip end of the first piece 2a is formed with a claw 2a1 which projects to the upper side opposite to the second piece 2b. The second piece 2b has an arc-shaped bottom surface which becomes convex to the lower side opposite to the first piece 2a. While the first piece 2a is elastically deformed, the attaching part 2 is inserted into an attachment hole 14b2 of the outer-side piece 14b of the anchor member 14 in the projecting direction. The shape of the first piece 2a is then elastically restored and claw 2a1 is locked on an inner surface 14b4 of the outer-side piece 14b. As a result, the attaching member 1 is attached on the anchor member 14.

The first cover portion 3a is formed with a pair of locking parts 5, as shown in FIGS. 4 and 6. The locking parts 5 project downwards from front and rear sides of the first cover portion 3a. The locking parts 5 project toward the inner surface 14b4 of the outer-side piece 14b and cooperate with the second cover portion 3b to prevent the attaching member 1 from moving in a width direction with respect to the anchor part 4 while sandwiching the outer-side piece 14b with the second cover portion 3b.

The holder part 4 includes a first holder piece 4a and a second holder piece 4b, as shown in FIGS. 5 and 6. The first holder piece 4a extends upwards from the center of an inner end of the first cover portion 3a. The second holder piece 4b is connected to the tip end of the first holder piece 4a through a hinge portion 4c. Since the hinge portion 4c is thinner than the first holder piece 4a, the hinge portion 4c is configured to be easily deformed. The second holder piece 4b is formed with a locking claw 4d at the tip end portion thereof to be engaged with a locking claw 3a1 formed at the first cover portion 3a.

As shown in FIGS. 5 and 6, the second holder piece 4b is rotated with respect to the first holder piece 4a to engage the locking claw 4d with the locking claw 3a1. The electrical wiring 16 is interposed between the first holder piece 4a and the second holder piece 4b. The electrical wiring 16 is held onto the upper side of the protection part 3 by the holder part 4.

Figure 8:
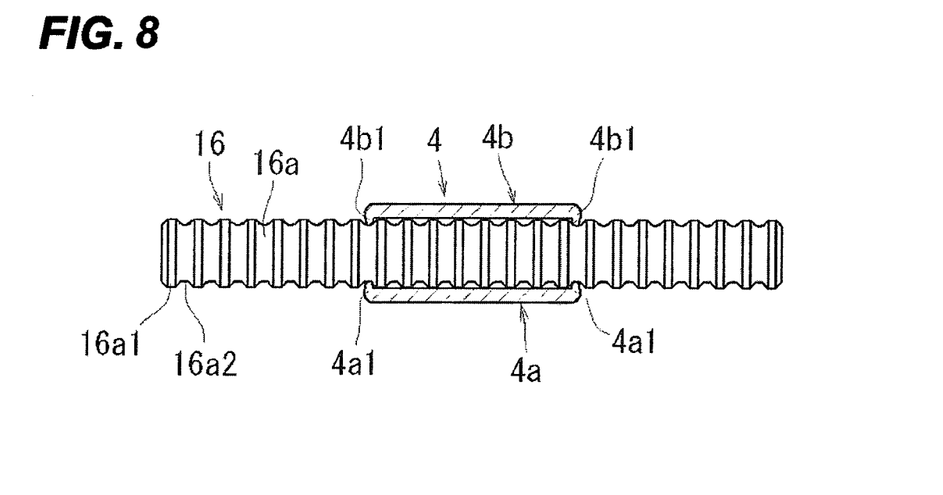
FIG. 8 is a cross-sectional view taken along a line VIII-VIII of FIG. 7.

As shown in FIGS. 7 and 8, claws 4a1 and 4b1 are formed at the front and rear end portions of the first holder piece 4a and the second holder piece 4b. The claws 4a1 and 4b1 enter a concave portion 16a2 of the cover 16a of the electric wiring 16 to prevent the electric wiring 16 from moving in forward and backward directions with respect to the holder part 4.

The attaching member 1 is attached to the left side of the vehicle seat 10, as shown in FIG. 1. However, the attaching member 1 may be used at the right side of the vehicle seat 10. In this case, the attaching member 1 may be used by reversing a direction from left to right. As a result, the attaching member 1 may be used at both left and right sides of the vehicle seat 10 with the same shape.

As described above, the attaching member 1 integrally includes the attaching part 2 attached on an anchor member (body member) 14, the protection part 3 which covers the edge 14b1 of the anchor member (body member) 14, and the holder part 4 which holds the electric wiring 16, as shown in FIG. 2.

Therefore, the edge 14b1 of the anchor member (body member) 14 is covered by the protection part 3. As a result, it is possible to prevent the electric wiring 16 from being damaged due to contact with the edge 14b1 of the anchor member (body member) 14. The attaching member 1 integrally includes the attaching part 2, the protection part 3, and the holder part 4. Accordingly, while the number of components does not increase, the electric wiring 16 can be attached on the anchor member (body member) 14, and it is also possible to protect the electric wiring 16 from the edge 14b1 of the anchor member (body member) 14.

As shown in FIG. 2, the protection part 3 is in contact with the anchor member (body member) 14. The attaching part 2 and the holder part 4, respectively, extend from the protection part 3. Accordingly, when the electric wiring 16 vibrate, the holder part 4 may vibrate around the protection part 3. In this regard, the attaching member 1 can be prevented from vibrating with respect to the anchor member (body member) 14 by the protection part 3 and the attaching part 2. Therefore, the vibration of electric wiring 16 can be suppressed by the attaching member 1.

As shown in FIG. 2, the attaching part 2 is attached on the body member which is the anchor member 14 connected with the seat belt 15. The protection part 3 covers the upper edge 14b1 of the anchor member 14. The holder part 4 holds the electric wiring 16 extending from the seat belt 15 at the upper side of the anchor member 14.

That is, since the electric wiring 16 extends from the seat belt 15, the electric wiring 16 comes close to the anchor member 14. The anchor member 14 is made of a relatively rigid material to tolerate the force applied from seat belt 15. For this reason, since the edge 14b1 of the anchor member 14 is made of a rigid material, it is relatively difficult to deform edge 14b1, thereby easily damaging a member that contacts the edge. However, the attaching member 1 covers the upper edge 14b1 of the anchor member 14, and further, holds the electric wiring 16 onto the upper side of the anchor member 14. Therefore, the electric wiring 16 can be suppressed from being in contact with the upper edge 14b1 of the anchor member 14. Thus the electric wiring 16 can be suppressed from any damage by anchor member 14.

While the present invention has been shown and described with reference to certain illustrative embodiments thereof, it will be understood by those skilled in the art that various changes in form and details may be made therein without departing from the spirit and scope of the invention as defined by the appended claims.

For example, the attaching member 1 may be used to attach another electric wiring on another body member. Another electric wiring is, for example, an electric wiring connected to a driving device such as a motor for changing the position or shape of the vehicle seat 10. The body member is, for example, a frame of the seat cushion or seat back 12, or a member attached on the frame.

Further, the protection part 3 may cover another edge of the body member, rather than the upper edge of the body member such as the anchor member 14. The protection part 3 may have only the first cover portion 3a, without the second cover portion 3b. In this case, the attaching part 2 extends from the first cover portion 3a.

Further, the holder part 4 may extend to the side (outer side or inner side) of the protection part 3, rather than the upper side of the protection part 3. The holder part 4 may be configured, for example, to have an opening having a C-shaped cross section and elastically hold an electric wiring by receiving the electric wiring from the opening.

What is claimed is:

1. An attaching member which attaches electric wiring on a body member of a vehicle seat, the body member having an attaching hole, the attaching member comprising:
    an attacher element to be attached on the body member;
    a protector which covers an edge of the body member; and
    a holder which holds the electric wiring, the attacher element, protector and holder comprising an integral member,
    wherein the protector has an L-shaped cross section and integrally includes a first cover portion which covers the edge of the body member and a second cover portion which extends in parallel to and covers a side face of the body member,
    wherein the attacher element projects from the second cover portion in a projecting direction orthogonal to an extending direction of the second cover portion, and
    wherein the attacher element is configured to be inserted into the attachment hole of the body member in the projecting direction,
    wherein the protector further a pair of locking parts spaced from the second cover portion and projecting toward the second cover portion, wherein the attacher element and the pair of locking parts are located on the same side of the second cover portion, wherein the pair of locking parts are configured to sandwich the body member with the second cover portion, and wherein the pair of locking parts are provided on both sides with repsect to the attacher element, and the holder is configured to hold the electric wiring in a state such that the electric wiring extends in a direction orthogonal to the projecting direction of the attacher element.

2. The attaching member according to claim 1,
wherein the protector is configured to contact the body member, and
wherein the attacher element and the holder, respectively, extend from the protector.

3. The attaching member according to claim 1, the body member comprising an anchor member connected with a seat belt, and
wherein the attacher element is attached on the body member, the protector covers an upper edge of the anchor member, and the holder holds the electric wiring extending from the seat belt at an upper side of the anchor member.

4. The attaching member according to claim 1,
wherein the holder is provided at an upper side of the first cover portion.

5. The attaching member according to claim 1,
wherein the attacher element, the protector and the holder comprise a single resin member.

6. The attaching member according to claim 1, the holder comprising a first holder piece and a second holder piece connected by a hinge, the second holder piece being rotatable relative to said first holder piece, about said hinge, to secure electric wiring in place.

7. The attaching member according to claim 6, a free end of said second holder piece including a locking member configured to engage with a cooperating portion of said first holder piece to secure electric wiring in place.

8. An attaching member which attaches an electrical wire to a body member of a vehicle seat, the attaching member comprising:
an attacher element, to be attached to the body member;
a protector, which covers an edge of the body member, the protector comprising an L-shaped cross section including a first cover portion which covers an edge of the body member and a second cover portion which extends parallel to and covers a side face of the body member, the protector further comprising a pair of lock members extending from the first cover portion, each positioned at one side of the attacher element, and spaced from the attacher element in a length direction of the attaching member, the attacher element and the pair of locking members are located on the same side of the second cover portion; and
a holder which holds the electric wiring, the holder being configured to hold the electric wiring such that the electric wiring extends in the length direction of the attaching member;
wherein the lock members and the second cover portion are configured to sandwich the body member and prevent movement of the attaching member in a direction transverse to the length direction.

9. The attaching member according to claim 8, the holder comprising a first holder piece and a second holder piece connected by a hinge, the second holder piece being rotatable relative to said first holder piece, about the hinge, to secure electrical wiring in place between said first and second holder pieces.

\* \* \* \* \*